United States Patent [19]

Thomas et al.

[11] Patent Number: 4,961,025
[45] Date of Patent: Oct. 2, 1990

[54] CATHODE FOR IMAGE INTENSIFIER TUBE HAVING REDUCED VEILING GLARE

[75] Inventors: Nils I. Thomas, Roanoke; Albert F. Tien, Salem; Kenneth A. Brown, Buchanan, all of Va.

[73] Assignee: ITT Corporation, New York, N.Y.

[21] Appl. No.: 233,501

[22] Filed: Aug. 18, 1988

[51] Int. Cl.⁵ .......................... C03B 32/00; H01J 43/28
[52] U.S. Cl. .................................. 313/524; 313/371; 65/32.1
[58] Field of Search ............... 313/524, 541, 523, 525, 313/526, 534, 371; 501/13, 67, 66; 65/32.1, 32.4, 32.5, 60.1, 60.4

[56] References Cited

U.S. PATENT DOCUMENTS

| | | | |
|---|---|---|---|
| 3,892,582 | 7/1975 | Simms | 106/52 |
| 3,920,463 | 11/1975 | Simms | 106/54 |
| 4,259,406 | 3/1981 | Borrelli | 428/410 |
| 4,406,973 | 9/1983 | Stowe | 313/541 |
| 4,475,059 | 10/1984 | Sink | 313/534 |
| 4,498,919 | 2/1985 | Mann | 65/30.11 |
| 4,661,079 | 4/1987 | Harris et al. | 313/524 X |
| 4,724,357 | 2/1988 | Drinkwine | 313/524 |
| 4,760,307 | 7/1988 | Howorth | 313/524 X |

*Primary Examiner*—Kenneth Wieder
*Attorney, Agent, or Firm*—Thomas N. Twomey

[57] ABSTRACT

An image intensifier tube has a faceplate formed of optical material. The outer surface of the faceplate has light receiving and light transmitting surfaces and a layer of a reduced metal oxide material for reducing stray light which is transmitted into the faceplate and reflected off of internal surfaces thereof. The layer has a blackened appearance and is formed by reducing the metal oxide of the faceplate material with hydrogen at a predetermined pressure and temperature to cause the blackening to reach a depth sufficient to reduce transmission of stray light therethrough.

11 Claims, 4 Drawing Sheets

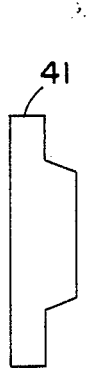 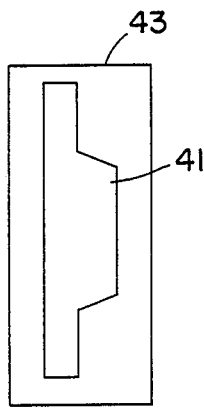 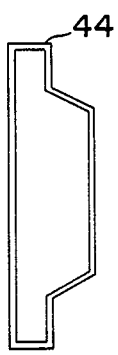 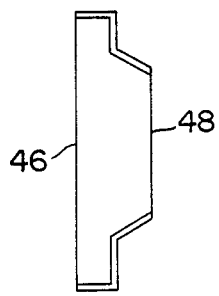
FIG.5a    FIG.5b    FIG.5c    FIG.5d
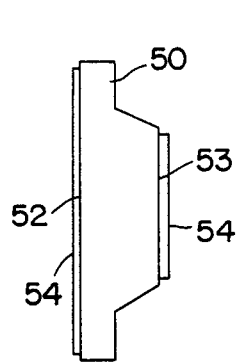 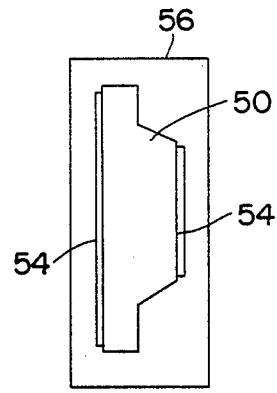 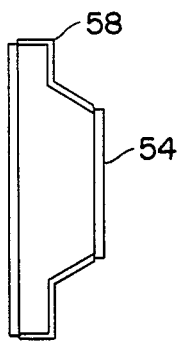 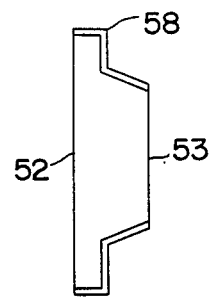
FIG.6a    FIG.6b    FIG.6c    FIG.6d
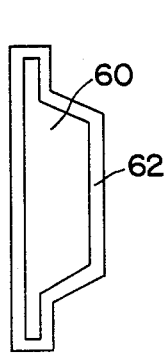 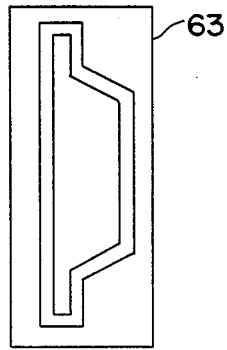 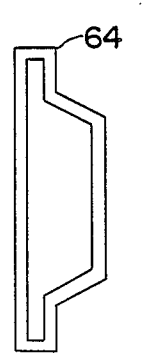 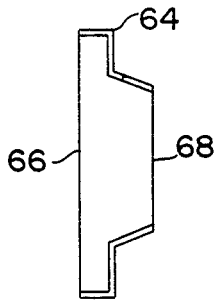
FIG.7a    FIG.7b    FIG.7c    FIG.7d

CATHODE FOR IMAGE INTENSIFIER TUBE HAVING REDUCED VEILING GLARE

BACKGROUND OF THE INVENTION

This invention relates to image intensifier tubes of the type used in night vision viewing systems and, more particularly, to an image intensifier tube with reduced veiling glare and a method of making the same.

Image intensifier tubes amplify the amount of incident light they receive and thus provide an increase in light output which can be supplied either to a camera or directly to the eyes of a viewer. These devices are particularly useful for providing images from dark regions and have both industrial and military application. For example, these devices are used for enhancing the night vision of aviators, for photographing astronomical bodies and for providing night vision to sufferers of retinitis pigmentosa (night blindness).

Modern image intensifier tubes utilize a microchannel plate (MCP) which is a thin glass plate having an array of microscopic holes through it. Each hole is capable of acting as a channel-type secondary emission electron multiplier. When the micro-channel plate is placed in the plane of an electron image in an intensifier tube, one can achieve a gain of up to several thousand. Since each channel in a micro-channel plate operates nearly independently of all the others, a bright point source of light will saturate a few channels but will not spread out over adjacent area. This characteristic of "local saturation" makes these tubes more immune to blooming at bright areas. However, these tubes suffer from a problem known as stray light or "veiling glare".

Stray light is any unwanted unimaged light received by a detector in an optical system. It emanates from bright light rays which are outside the normal field of view. In a lensed optical system, stray light can reflect off of the multiple lens elements causing severe imaging problems by decreasing visibility of low contrast objects. For example, in image intensifier tubes, it results in a loss of contrast by filling in the darker portions of the image.

There have been various attempts to eliminate or reduce stray light including the addition of light absorbing material to the faceplate of the image intensifier tube. For example, a groove was etched between the light input surface of the faceplate and the surface reflecting the stray light, and the groove filled with light absorbing material. Another method included placing a ring of black glass around the outer surface of a clear glass disk. The ring and disk were heated and pressed together to form a unitary structure. These methods have been difficult to perform and have been expensive.

One significant problem involves the formation of the sloping surfaces of the faceplate. In the ring and disk arrangement the sloping surfaces are obtained by the grinding of the black glass ring, thus leaving portions of the sloping surfaces with only a thin layer of the black glass.

In addition, the latter method has caused problems in subsequent processing of the faceplate when photoemissive material is bonded to one surface of the structure. Since the ring and disk are generally formed of two different glasses, bonding is difficult, one reason being the difference in temperatures at which fusing of the cathode material occurs. In order to ease bonding problems, a portion of the black glass adjacent the bonding surface is removed, leaving an unprotected area resulting in 100% internal reflection of stray light off of the surface.

Because the different glasses have different indices of refraction, problems include difficulties with reflection of unwanted stray light.

Another problem arises due to the fact that the material of the black glass ring is transmissive in the 600 nm to 1000 nm (red) spectral region. Since absorption is significantly lower than expected, photons are actually transmitted to the sloping surfaces of the faceplate, and are scattered directly to the cathode. This is a significant problem for image tubes which operate in the 700 nm-900 nm (red) spectral range.

One method of minimizing stray light in the photochromic lens art is by hydrogen reduction of a lens blank. However, in the present art, hydrogen reduction of a faceplate blank results in an extremely thin "skin" layer which is highly transmissive in the red spectral region.

It is therefore an object of the present invention to provide a optical system having reduced light scatter.

It is an additional object of the invention to provide a cathode face plate which reduces the incidence of stray light in an image intensifier tube.

It is a further object of the invention to provide a method for forming such an optical face plate in an easy and economical manner.

These objects and others which will become apparent hereinafter are accomplished by the present invention which provides an image intensifier tube having a face plate formed of optical material having an outer surface, one portion of the outer surface being a light receiving surface and another portion of the outer surface being a light transmitting surface, the remainder of the outer surface having a reduced metal oxide material, exhibiting a blackened appearance, included in the optical material for absorbing stray light in the face plate, photoemissive means on the light transmitting surface for emitting electrons in response to light received at the photoemissive means from the light transmitting surface, and a micro-channel plate positioned adjacent the photoemissive means for amplifying the electrons emitted from the photoemissive means.

A method of reducing stray light in a faceplate for an image intensifer tube includes forming a light absorbing layer in the outer surface of the faceplate by causing hydrogen which is pressurized above one atmosphere to react with the oxygen of a metal oxide material of the faceplate to a depth sufficient to reduce stray light which is received in the faceplate and is reflected off of an internal surface thereof.

Additional insight into the present invention may be obtained by reference to commonly owned, copending U.S. patent application Ser. No. 07/233,502, entitled "Reducing Stray Light in Lensed Optical Systems", filed on even date herewith.

BRIEF DESCRIPTION OF THE DRAWING

The above-mentioned and other features and objects of the invention will become more apparent by reference to the following description taken in conjunction with the accompanying drawings in which:

FIG. 5 (a)-FIG. 5 (d) is a diagrammatic representation of a method of performing the present invention;

FIG. 6 (a)-FIG. 6 (d) is a diagrammatic representation of a modification to the method of the present invention;

FIG. 7 (a)-FIG. 7 (d) is a diagrammatic representation of another modification of the method of the present invention.

DETAILED DESCRIPTION OF THE INVENTION

Figure 1:
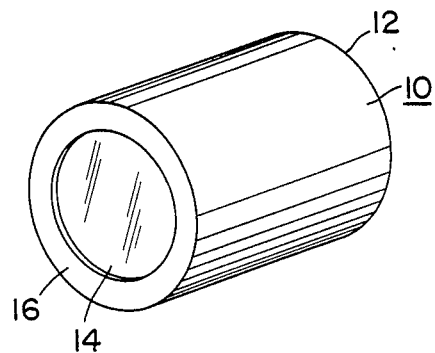
FIG. 1 is a perspective plan view of an image intensifier tube.

In FIG. 1, there is shown a simplified perspective view of an image intensifier tube 10. The image intensifier tube 10 includes a cylindrical housing 12 in which is located a front face plate 14 made of optical material which is arranged to receive and transmit light. The face plate 14 is normally sealed within the housing 12 and is surrounded by a peripheral flange 16. Light rays from the field of view penetrate the face plate 14 and are directed to the electronics of the image intensifier where the number of electrons are amplified.

Figure 2:
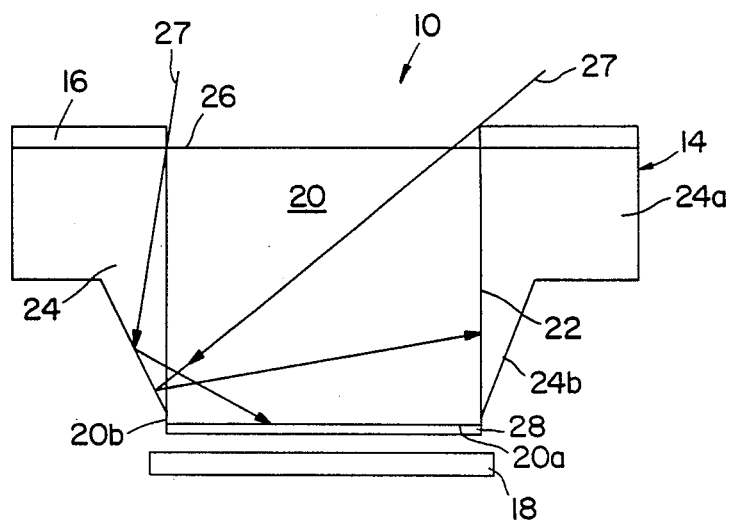
FIG. 2 is a cross-sectional view of a prior art glass face plate with a ring of black glass.

Referring to FIG. 2, an image intensifier tube 10 comprises three basic components: the face plate 14 which functions as a cathode; a face plate, not illustrated, which functions as an anode; and a micro-channel plate 18 spaced from the face plate 14. Both the cathode and anode face plates are preferably formed from glass of high optical quality. The micro-channel plate is also formed of a glass material which possesses a secondary emissive property and conductive characteristics. The micro-channel plate 18 is mounted in the image tube with both its input and output faces parallel to the image tube cathode face plate 14 and a phosphorous screen associated with the anode face plate.

In shape, the face plate 14 includes a central, generally circular body portion 20. A ring of black glass 24 is positioned on an outer surface 22 of the body portion 20. The black glass has a sill 24a in the form of a flange surrounding a portion of the outer surface 22. The black glass 24 has a reduced thickness in the area of sloping surfaces 24b and ends above an end surface 20a of the body portion 20 to permit the bonding of a photoemissive wafer 28 to the end surface 20a. This leaves an area 20b with no surrounding black glass.

Figure 3:
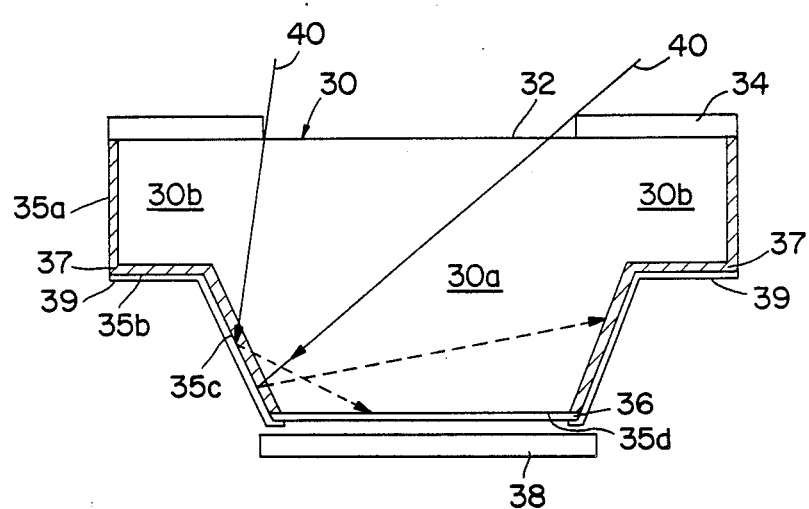
FIG. 3 is a cross-sectional view of a glass face plate with a area of blackened material of the present invention.

Reference will now be made to FIG. 3. A faceplate 30 includes a central, generally circular body portion 30a and a reduced thickness sill portion 30b in the form of a flange surrounding the body portion. One surface 32 of the face plate 30 extends continuously across the body and sill portions 30a and 30b, respectively, and the portion of this surface extending over the sill portion 30b and a small adjacent portion of the central body portion 30a fits under a flange 34 and is secured thereto to retain the face plate in a housing (not shown). The remainder of the portion of surface 32, that is, that portion surrounded by the flange 34 is the exposed surface of the face plate 30 on which input light impinges.

The face plate 30 also includes surface portions 35b and 35d which are generally parallel to surface 32 and which extend over the sill portion 30b and the body portion 30a, respectively. The surface 35c is the surface through which light is transmitted to the photoemissive wafer 36. One or both of the surfaces 32 and 35d may be curved to form a lens to enhance the image. Because of the difference in thickness between the body portion 30a and sill portion 30b, the surface portions 35b and 35c lie in different planes with the portion 35c being spaced farther from the surface 32 than is the portion 35b. Connecting the surface portions 35b and 35c is a sloping surface portion 35b which, in the embodiment disclosed herein is generally frusto-conical.

In this embodiment the face plate 30 is made of a clear, high quality optical glass such as Corning 7056. This glass comprises 70 percent silica ($SiO_2$), 17 percent boric oxide ($B_2O_3$), 8 percent potash ($K_2O$), 3 percent alumina ($Al_2O_3$) and 1 percent each of soda ($Na_2O$) and lithium oxide ($Li_2O$). Other glasses may be used.

An area 37 of blackened optical glass extends inwardly from the surfaces 35a, 35b and 35c. It is this blackened glass which significantly reduces the incidence of stray light in the faceplate.

As is usual in the art, surface portion 35c has a photoemissive wafer 36 formed thereon so that light impinging on the exposed portion of surface 32 and eventually striking the wafer 36 causes the emission of electrons. In the embodiment described herein, the wafer 36 is bonded to the surface 35c. These electrons are accelerated across a gap by an electric field to the MCP 38 causing the secondary emission of electrons, all in accordance with known principles. The usual photoemissive wafer is a suitable gallium arsenide (GaAs) device, but other suitable materials can be used.

Connecting the photoemissive material 36 to an external biasing power supply (not shown) is a coating of conductive material 39 applied to the surfaces 35b and 35b and also over a portion of surface 35c so that this coating makes contact with the wafer 36. The most usual way of applying the coating 39 is to evaporate a metal, e.g., Inconel, on these surfaces by conventional techniques.

FIG. 2 shows the prior art face plate 14 with the black glass 24 surrounding most of the surface 22. Incoming light rays 27 which are outside the normal field of view enter the faceplate through a surface 26. The light rays 27 pass into the black glass 24 and because of the transmissiveness of the glass 24 are reflected back into the faceplate and are reflected to the surface 20a and transmitted to the photoemissive wafer 28. The amount of stray light remaining in the faceplate and directed to the surface 20a is in the range of greater than 0.8% depending on how poor the cathode bond is.

Referring to FIG. 3, the faceplate 30 of the present invention has an area of blackened optical material 37 formed in surfaces 35a, 35b and 35c. Incoming unwanted light rays 40 enter the face plate 30 at a surface 32. These rays strike the area of blackened material 37 and are substantially eliminated. The fractional percentage of light reflected out of the area 37 is represented by the dotted lines.

By means of this invention the increased absorption of stray light by the area of blackened material 37 results in a substantial reduction of total stray light in the face plate 30 to less than 0.8%. This includes operation in the 600 nm-1000 nm spectral region.

Figure 4:
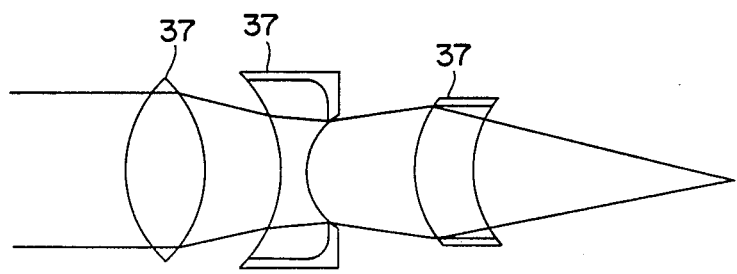
FIG. 4 is a cross-sectional view of different configurations of lenses which include the reduced stray light feature of the present invention.

The faceplate is generally formed with the surfaces 32 and 35c being parallel planar surfaces. However, one or both of the surfaces may be ground to form a convex or concave configuration and act as a lens. In this connection, FIG. 4 shows three different configurations of optical lenses showing the blackened area 37.

Formation of the blackened area 37 may be performed in a number of ways. A preferred method is described hereinbelow.

Glass is generally opaque to hydrogen diffusion. Controlled formation of an area of blackened material is difficult to achieve since the glass will tend to slump if fired at too high a temperature for too long a time. By this invention it has been found that under certain time, temperature and pressure conditions, diffusion of hydrogen into an area of a glass to a depth sufficient to absorb stray light in the glass can be achieved without causing "slumping" of the glass.

Most glass is formed of silicates and has metals added in the form of metal oxides to achieve special optical characteristics. For example, boron may be added to change the refractive index of the glass. Other elements which are added to glass are barium, potassium and sodium. By means of reduction of the metal oxides of the glass by hydrogen gas, the oxygen leaves the glass and the metal oxide is left in a reduced metal oxide state, and in some cases the metal oxide is completely reduced, leaving the metal in its elemental form. It is the reduced metal oxide which causes the glass to become discolored or "blackened". "Blackened" does not necessarily intend to mean the color black but is used to convey the intent that the area is substantially opaque to the transmission of light rays. The coloration or blackening varies with the base glass composition. The glass matrix is actually changed by the hydrogen reduction.

The blackened area of the glass absorbs substantially all of the stray light in the faceplate caused by reflection off of the faceplate surfaces. By means of the method of this invention a blackened area is formed which extends tens of thousandths of an inch into the glass for certain glasses. This depth is sufficient to reduce stray light for most faceplate applications. However, the depth may be increased or decreased for specific uses. The blackened area is highly absorbent to all wavelengths including the red or 600 nm to 1000 nm range.

There will also be no reflection off of any interface between clear glass/blackened glass as in the prior art since the indices of refraction of both areas are identical. Thus, all of the photons directed towards to blackened area will enter that area.

Yet another advantage of this invention is that scatter of photons off of the microstructure of the faceplate surfaces (edge scatter) is highly reduced since the glass, during hydrogen reduction, is brought to a temperature at which the glass starts to flow, thereby curing any microcracks and defects which are present in the glass. This is referred to a "fire-polishing."

FIG. 5 (a)-(d) illustrates one method of producing an attenuating "blackened" area around the edge circumference of a faceplate. This method is referred to as the "brute force" method and is one of the easiest to perform.

A glass faceplate blank 41 having the general configuration of a finished faceplate but slightly oversized is placed in a furnace 43. For this particular example, Corning 7056 glass was used for the glass blank. The air in the furnace is removed by a vacuum system. This permits the furnace to be checked for leaks and also removes any oxygen in the furnace to prevent a reaction between the oxygen in the air and the hydrogen gas which is introduced into the furnace. Hydrogen gas ($H_2$) is admitted into the furnace 43 until a pressure in the range of 25 psi or approximately 1.7 atmospheres is attained. Pressures above one atmosphere are desirable since the chemical reaction rate is faster and the degree of light absorption is enhanced.

After the desired hydrogen pressure is reached, the temperature in the furnace is elevated to fire the glass and cause a reaction between the hydrogen gas and the oxygen ($O_2$) in the glass blank. The hydrogen reduction begins in the outer surface of the glass blank 41 and proceeds inwardly. The hydrogen reacts with the oxygen of the metal oxide of the glass material to form water, leaving the metal oxide in a reduced form in the glass. The metal oxide may be reduced completely, leaving the metal in its elemental state. The blackening of the glass is a combined function of the absorption coefficient and the thickness of the absorption layer. The water resulting from the reduction is baked out of the glass.

The higher the temperature and the higher the hydrogen pressure, the faster the reduction reaction will occur. Also at high temperatures and pressures, the blackening will continue deeper into the glass. In addition, higher hydrogen pressure increases the energy level of the gas resulting in more of the metal oxide being reduced per unit area than at lower pressures. Thus, the light absorbing capability of the area is greatly increased.

The time, temperature and pressure may be adjusted to satisfy the depth requirements for the particular application of the faceplate system. In addition, adjustments to the firing parameters may be necessary for different types of glasses.

However, temperatures near the softening point of a glass and long term exposure of the glass to the high temperatures will cause some glass to "slump". For example, Corning 7056 glass will slump excessively for firing temperatures above 680° C. and for time periods longer than 48 hours. For this glass it has been found that a firing temperature of approximately 640° C. and a firing time of approximately 48 hours will substantially eliminate this problem and produce a blackened area to a depth in the range of 0.020–0.030 inch which is suitable, for example, for forming a light absorbing area in a glass faceplate for an image intensifier tube. The same depth and degree of blackening was achieved in the faceplate using the 25 psi hydrogen gas pressure, with a temperature of 620° C. for 72 hours. The 640° C./48 hour parameters are desirable, however, because of the increase in production of the faceplates using Corning 7056 glass which is obtainable with the shorter firing time. For each glass type that is to be fired, suitable firing parameters will need to be experimentally determined.

Following the firing of the glass blank, an area of blackened material 44 is formed around the entire perimeter of the face plate blank. Light receiving and light transmitting surfaces 46, 48, respectively, are ground and polished until no blackening is left on the surfaces as shown in FIG. 5(d).

The process may be modified to minimize the time needed for the post firing grinding and polishing of the light receiving and transmitting surfaces.

In this connection a mask is applied to the surfaces which will eventually form the light receiving and transmitting surfaces, 52, 53, respectively. Reference is now made to FIG. 6 (a)-(d). The mask 54 is applied to the glass blank 50 either before (FIG. 6(a)) or after (not shown) the light receiving and transmitting surfaces 52, 53 are rough ground. It has been found that silicon nitride (Si3N4) produces an excellent mask.

The mask 54 may be deposited in any known manner. Some examples of mask formation methods are sputter deposition and plasma deposition.

In one method of mask formation, the surface or surfaces to which the mask will be applied is cleaned by sputter etching. The silicon nitride is then applied by reactive sputtering. A preferred thickness for the mask is 500 nm.

Once the mask 54 is deposited, the blank 50 is placed in a furnace 56 and the firing proceeds as described above, using a temperature of approximately 640° C. and a hydrogen pressure of 25 psi for 48 hours. After the firing has taken place, the mask 54 is removed by grinding and polishing, leaving a blackened area of optical material 58 on the surfaces from which stray light originates.

In another form of the brute force method, the light absorbing capability of the blackened area may be effectively increased by diffusing a metallic compound, such as a metal oxide or metal salt, into the glass prior to the reduction step. In this method, the optical material is heated to its softening point and placed in an atmosphere of, for example, silver oxide. At an elevated temperature, the silver ions diffuse into the optical material and react with the oxygen in the glass forming metal oxides in addition to the metal oxides already present in the glass material. The hydrogen reduction is then performed.

By introducing additional metal oxides into the glass, a greater concentration of reduced metal oxides will be present per unit area, resulting in enhanced light absorbing capability. The depth of the light absorbing area may therefore be reduced while still achieving the same level of light absorption.

Reference will now be made to FIG. 7 (a)–(d). In this modification, the material of a glass blank 60 is a porous glass. In porous glasses, which have air pockets throughout the silica material, hydrogen diffusion occurs rapidly throughout the glass and is very difficult to control. In order to provide better regulation of the blackening depth, a cladding glass 62 is positioned around the entire blank 60 prior to firing. The cladding glass 62 has a softening point which is the same as that of the porous glass. The refractive index of the cladding glass may be similar to that of the porous glass, but it is not essential that it be the same. The blank 60 and cladding glass 62 are placed in a furnace 63, and the hydrogen reduction is allowed to continue until a blackening layer 64 extends through the thickness of the cladding glass. The surfaces 66, 68 are then ground and polished to remove the blackened layer and to form the light receiving and light transmitting surfaces, respectively.

Processing of the face plate to form a photocathode then proceeds as described above with the application of the photoemissive wafer and conductive coatings.

FIG. 8 shows an alternate method of practising the invention. Instead of using a faceplate blank which has already been machined oversize to the general configuration of a finished product, a disk or block of optical material may be both molded and hydrogen reduced in one operation. Additional advantages result from this method. Since a machined blank is not required, a flat disk of fairly loose tolerances can be used. In addition, hydrogen firing times can be extremely short.

Figure 8A:
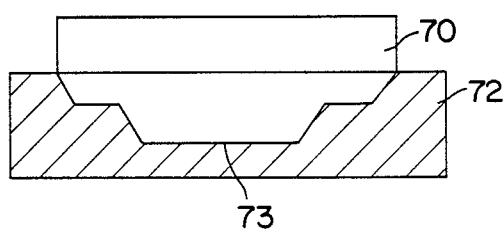
FIG. 8 (a)-FIG. 8 (d): is a diagrammatic representation of an alternative method of the present invention.
Figure 8B:
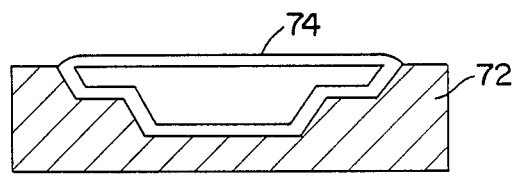
Figure 8C:
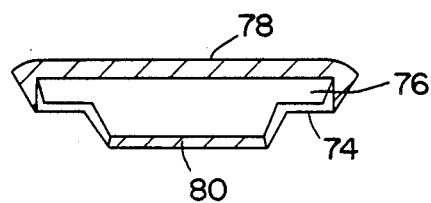
Figure 8D:
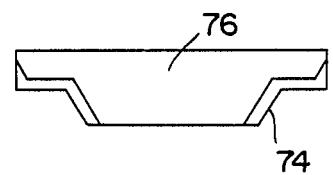

Referring to FIG. 8(a), a flat disk of optical material 70 is placed on a mold form 72. The mold 72 should be of sufficient size to allow grinding of the formed faceplate to a finished product. The mold is formed of a hydrogen permeable material such as graphite or ceramic. The mold and disk are placed in a furnace and hydrogen fired at a temperature high enough to allow the glass to flow and cause the hydrogen reduction to occur. For example, Corning 7056 glass is hydrogen fired and reduced at approximately 800° C. for four hours. At this temperature the optical material flows to the shape of the mold and at the same time the outer surfaces of the optical material become blackened as shown in FIG. 8(b). Following cooling of the formed faceplate 76, the parallel surfaces 78, 80 which will receive and transmit light respectively are ground to remove the blackened areas and to achieve the final faceplate dimensions. The surface 73 of the mold may be formed with a layer of material which is not permeable to hydrogen such as silicon nitride or boron nitride. The areas which are ground are indicated by hatch marks in FIG. 8(c). In this way the surface 80 of the formed faceplate will not need to be ground, further reducing processing time and cost. The finished faceplate is shown in FIG. 8(d).

This alternate method of processing Corning 7056 glass results in a blackened layer transmission as low as 0.1% compared to approximately 1.0% transmission for firing at 640° C. for 48 hours.

While the principles of the invention have been described in connection with specific apparatus and methods, it is to be clearly understood that this description is made only by way of example and not as a limitation to the scope of the invention as set forth in the objects thereof and in the accompanying claims.

What is claimed is:

1. A method of producing a faceplate for an image intensifier tube which has capacity for reducing stray light therein, comprising the steps of:
   providing a mold having an opening therein having a shape which conforms substantially to the configuration of the faceplate to be produced;
   placing a blank of optical material of a glass composition including a metal oxide in the glass matrix on the mold and extending over the opening;
   subjecting the blank and the mold to a reducing environment of hydrogen gas at a pressure above one atmosphere and to heating at an elevated temperature;
   bringing the temperature of the hydrogen and blank to a level at which the optical material softens and flows into and fills the shape of the opening and, at the same time, the hydrogen reacts with the metal oxide in the optical material of the blank to form a light absorbing area of reduced metal oxide which optically darkens the optical material, said light absorbing area extending from the outer surface of the blank into the optical material to a depth of sufficient to reduce stray light in the resulting faceplate.

2. A method according to claim 1, wherein in said bringing step said light absorbing area is formed to a depth of 0.020–0.030 inch for reducing stray light in the faceplate to less than 0.8% in the spectral region of 600nm–1000nm.

3. A method according to claim 2, wherein said light absorbing area reduces stray light in the faceplate to less than 0.1% in the spectral region of 600nm–1000nm.

4. A method according to claim 1, wherein in said bringing step said metal oxide is reduced to its elemental metal state.

5. A method according to claim 1, wherein said optical material is of the Corning type 7056 glass, and in said bringing step said temperature is maintained at about 800 degrees Centigrade for about four hours.

6. A method according to claim 1, further comprising the step of removing the darkened layer in at least one area of the outer surface in order to permit light to be received and transmitted therethrough.

7. A method according to claim 1, wherein prior to said subjecting and bringing steps a masking layer of material impermeable to hydrogen is placed on surfaces of said blank which are not to be darkened.

8. A method according to claim 7, wherein said masking layer is silicon nitride or boron nitride.

9. An image intensifier tube comprising:
a faceplate formed of optical material having a light receiving surface and a light transmitting surface on opposite sides of an optical axis thereof and a light absorbing area on an outer surface of said faceplate radially spaced in a direction normal to the optical axis, said light absorbing area containing reduced metal oxide which optically darkens the optical material extending from the outer surface into the optical material to a depth of sufficient to reduce stray light in the resulting faceplate, said depth being in the range of 0.020-0.030 inch for reducing stray light in the faceplate to less than 0.8% in the spectral region of 600nm-1000nm;
photoemissive means at said light transmitting surface for emitting electrons in response to light transmitted through said faceplate; and
a micro-channel plate positioned adjacent said photoemissive means for amplifying the electrons emitted from said photoemissive means.

10. An image intensifier tube according to claim 9, wherein said metal oxide in said light absorbing area of said faceplate is reduced to its elemental metal state.

11. An image intensifier tube according to claim 9, wherein said light absorbing area reduces stray light in the faceplate to less than 0.1% in the spectral region of 600nm-1000nm.

* * * * *